Nov. 21, 1944.   R. H. FROST   2,362,994
SELF-LOADING DUMP TRUCK
Filed May 17, 1943   2 Sheets-Sheet 2

Inventor
Roy H. Frost
By Webster & Webster
Attorneys

Patented Nov. 21, 1944

2,362,994

UNITED STATES PATENT OFFICE 2,362,994

SELF-LOADING DUMP TRUCK

Roy H. Frost, Fresno, Calif., assignor of one-fourth to Edward J. Harp, Corcoran, one-fourth to Luther F. Thornburgh, and one-fourth to Harold I. Berg, both of Fresno, Calif.

Application May 17, 1943, Serial No. 487,296

11 Claims. (Cl. 214—78)

This invention relates generally to improvements in a self-loading dump truck, particularly a dump truck of the character shown in United States Letters Patent No. 2,286,723, dated June 16, 1942.

In a vehicle as above, the self-loading mechanism comprises a cross shaft rotatably mounted on the truck frame adjacent but rearwardly of the operator's cab, there being side arms normally projecting forwardly from the ends of the shaft alongside the forward portion of the truck to a point normally ahead of the cab, where said side arms are fitted with a scoop. The cross shaft is formed intermediate its ends with a normally rearwardly projecting crank, and a longitudinally extending power cylinder is pivotally connected with the vehicle frame rearwardly of said crank, the piston rod of said cylinder projecting forwardly and being connected to the crank pin whereby the cylinder can actuate said crank.

In order that the crank have sufficient throw under the influence of the power cylinder to swing from a position with the scoop in ground engagement in front of the vehicle to a position with the scoop rearwardly of the cab and above the dump body, the crank and power cylinder must be mounted so that they approach a point relatively close to dead center when the scoop is in said position of ground engagement, and which is the loading position. When the scoop is loaded and is ready to be lifted from its lowered position, the angle between the crank and power cylinder is relatively flat; the crank extending rearwardly and downwardly at an angle of only approximately 15° below horizontal, and the forwardly and downwardly extending power cylinder being disposed at a similar angle. Consequently, unless some booster arrangement is employed, an undue strain is placed on the power cylinder at the starting point and through the initial portion of the arc of movement of the crank.

It is therefore an object of this invention to embody, in combination with a vehicle self-loading mechanism as above, a novel booster arrangement, operative to increase the power applied to the crank through the first stage of its movement from starting or initial load lifting position; said booster arrangement including a booster power cylinder of relatively short stroke mounted so that its piston rod engages the upper edge of one cheek of the crank adjacent the crank pin. The main power cylinder and booster power cylinder are connected in series in the fluid pressure system whereby said cylinders first actuate simultaneously to impart a relatively slow but forceful action to the crank, and thereafter when the booster power cylinder has reached the end of its stroke it becomes ineffective and the entire fluid pressure is applied to the main power cylinder, resulting in increase of its speed of operation, which is possible and desirable once the load has been partially lifted, and the angle between the main power cylinder and crank is such that a more advantageous leverage is obtained.

Another object of this invention is to provide, in a self-loading vehicle which includes a cab, a dump body mounted therebehind, and a loading scoop mounted for swinging movement over the cab from a loading position ahead of the vehicle to a dumping position above the body; a forwardly projecting hood fixed on the front end of the dump body in position to overhang and protect the cab when the dump body is in lowered position and the swinging scoop is being operated to load the body, said hood having upstanding sides so that any material which may fall thereon from the scoop will subsequently be discharged rearwardly into the dump body upon upward and rearward tilting of the latter.

A further object of the invention is to produce a simple and inexpensive device, and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views.

Figure 1:
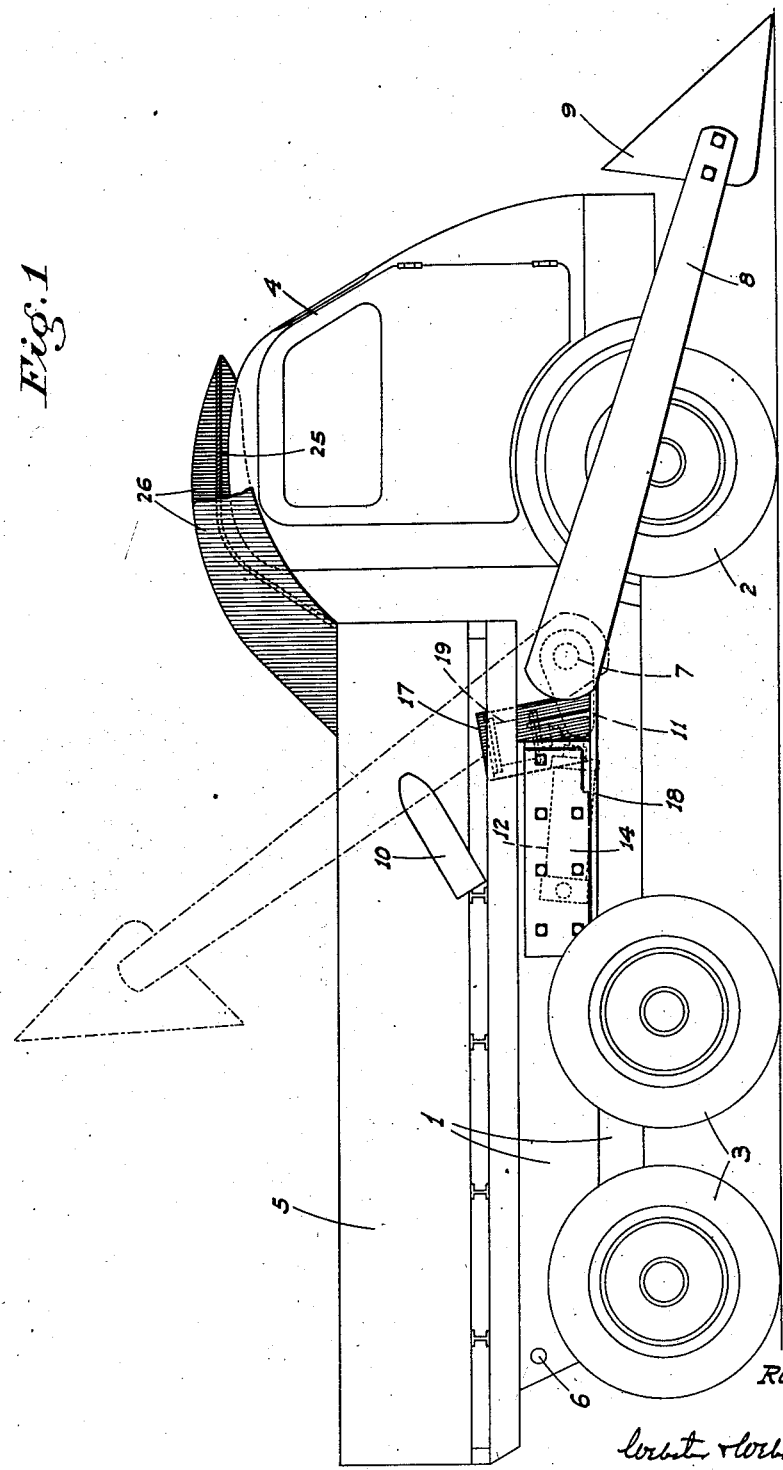
Figure 1 is a side elevation of a self-loading dump truck embodying the improvements which comprise the present invention.

Referring now more particularly to the characters of reference on the drawings, the self-loading dump truck comprises generally a main frame 1 supported by front and rear wheels 2 and 3 respectively, an operator's cab 4, and a dump body 5 of the type mounted for upward and rearward tilting movement about a pivot point 6; such dump body being actuated hydraulically, as is conventional, by hydraulic mechanism (not shown).

As in the above identified patent, the truck includes a cross shaft 7 suitably journaled in connection with the vehicle frame 1, and said shaft is fitted at its ends with rigid radial side arms 8 spaced apart for swinging movement in clearance relation to the front wheels and sides of the truck from the position as shown in full lines to the position shown in broken lines in Fig. 1. A scoop 9 is mounted between the outer ends of the arms 8; said scoop being disposed ahead of the cab and in ground engagement when the arms are in the position shown in full lines, while said scoop is in dumping position above the body 5 when the arms are in the position shown in broken lines. Shock absorbing units 10 mounted on opposite sides of the body 5 are engaged by the arms 8 when the scoop is swung to dumping position.

A crank 11 is formed in shaft 7 intermediate its ends and between the sides of the vehicle frame 1, and in the present embodiment said crank is adjacent one of said sides of the frame or offset transversely of the longitudinal center of the vehicle. This crank extends at a rearward and slightly downward angle when the arms 8 project forwardly with the scoop 9 in ground engaging or loading position. A main power cylinder 12 is disposed rearwardly of the crank and is pivoted at its rear end on a cross shaft 13, which is in turn carried by attachment plates 14 which are secured to the sides of the upper portion of frame 1. The main power cylinder 12 projects longitudinally forwardly from cross shaft 13 and the piston rod 15 of said cylinder is connected at its forward end with the crank pin 16 of crank 11. As will be seen, the main power cylinder 12 is disposed at a forward and only a slight downward incline when the arms 8 are in scoop loading position, and both the crank and main power cylinder are then closely adjacent dead center.

The above is substantially the actuating mechanism embodied in the above identified issued patent, and it is in combination with such mechanism that I embody my novel booster arrangement, and which comprises the following:

A rigid, inverted U-shaped yoke 17 is disposed above and straddles the outer end portion of the crank 11 when the same is in starting position, said yoke being supported at its lower end on bed plates 18, which in part form the support for the cross shaft 7.

Figure 2:
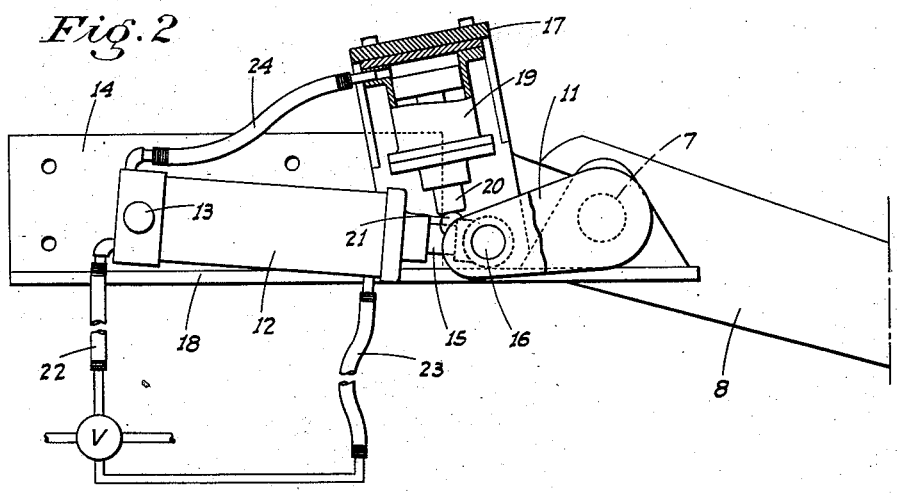
Figure 2 is an enlarged fragmentary elevation, partly in section, illustrating the booster power cylinder as mounted for cooperation with the crank of the loading mechanism; the crank, together with the main power cylinder and booster power cylinder, being shown in starting positions, and which they assume when the scoop is lowered into ground engagement for loading.

A booster power cylinder 19 of substantially the same effective diameter as the main power cylinder, but of materially shorter stroke, is mounted in inverted position in connection with the head of yoke 17 and from which head said booster power cylinder depends with its piston rod 20 projecting downwardly at substantially right angles to the crank 11 when the latter is in said starting position, as shown in Fig. 2.

The piston rod 20 is of substantial diameter, and when the crank is in said starting position the free end of piston rod 20 rides against a rounded cross block 21 of case-hardened steel fixed on the upper edge of one cheek of the crank outwardly of the crank pin.

The main power cylinder 12 is of double-acting type and includes fluid pressure supply conduits 22 and 23 leading to opposite ends thereof respectively, each conduit having valved connection with a source of fluid under pressure, and which may be the conventional pressure pump which the truck includes for actuation of the hydraulic lifting mechanism for the dump body.

The booster power cylinder 19 is single acting and a conduit 24 connects the upper end of said booster cylinder 19 in series with the corresponding end of main power cylinder 12 whereby when said main power cylinder 12 is actuated by pressure from conduit 22 to advance the piston rod 15, the booster power cylinder 19 is similarly actuated to advance rod 20.

In use the booster arrangement, as described, functions as follows:

With the scoop in lowered position and loaded, the crank 11 and main power cylinder 12 are disposed closely adjacent dead center, as shown in Fig. 2, and from such position the cylinder 12 requires assistance to initially start downward swinging movement of the crank and upward swinging movement of the loaded scoop. This assistance is given by the booster power cylinder 19. When pressure is initially introduced into the rear end portion of main power cylinder 12 by conduit 22, it is likewise introduced through conduit 24 into the upper end portion of cylinder 12. Consequently both cylinders are actuated simultaneously, the main power cylinder 12 starting the crank to swing downward and such downward movement being assisted by the pressure exerted on the cross block 21 by the piston rod 20 of the booster power cylinder 19.

Figure 3:
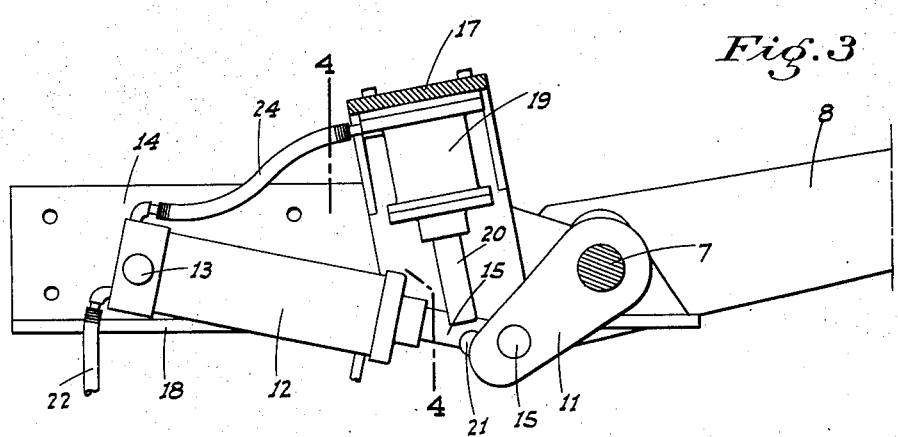
Figure 3 is a similar view illustrating the position of the crank and main power cylinder at substantially the end of the stroke of the booster power cylinder; the scoop then being only partially elevated.
Figure 4:
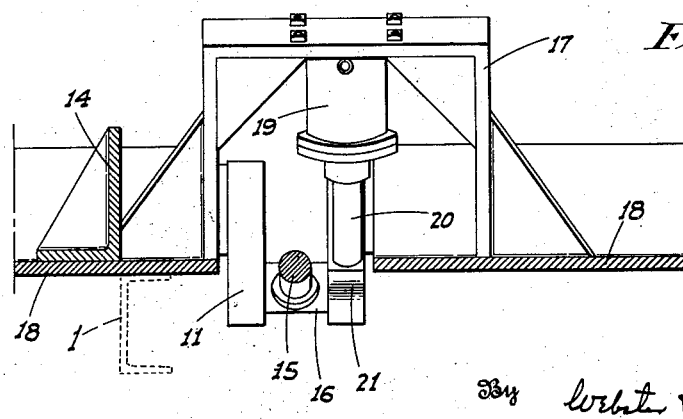
Figure 4 is an enlarged fragmentary cross section on line 4—4 of Fig. 3.

When the crank 11 reaches substantially the position shown in Fig. 3, the booster power cylinder 19 has reached the end of its stroke, whereupon it becomes ineffective and the cross block 21 leaves the piston rod 20. Thereafter, the pressure from conduit 22 continues to actuate the longer throw main power cylinder 12, and the speed of the piston rod 15 thereof increases somewhat after the booster power cylinder 19 has ceased to be effective. However, at such time the angle between the crank 11 and main power cylinder 12 has become such that the leverage is more advantageous and said last named cylinder is adequate to continue the rearward swinging movement of the arms 8 and scoop 9 to dumping position of the latter.

To return the crank and scoop to initial position, the conduit 22 is opened and pressure introduced into conduit 23 leading to the double-acting main power cylinder 12. This results in retraction of the piston rod 15, which swings the crank 11 up to its starting position, and in turn the cross block 21 engages and retracts piston rod 20 of cylinder 19, forcing the fluid therein back through conduit 24 and into conduit 22.

In order to protect the cab of the truck I mount a forwardly projecting hood 25 on the front end of the dump body 5; said hood overhanging the cab 4 of the truck when the dump body is in lowered position, whereby any material falling from the scoop 9 as it passes over said cab strikes the hood rather than the cab. The hood 25 also includes upstanding side plates 26 which extend rearwardly to the body and prevent material which may fall onto the hood from spilling laterally of the truck, and any such material which falls on said hood will, by virtue of the use of the side plates 26, be ultimately discharged into the body 5 upon rearward tilting of the latter.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. In a self-loading dump truck which includes a dump body mounted on the truck frame, and a swinging scoop assembly operative to load the scoop ahead of the truck and to swing the scoop upwardly and rearwardly to dumping position above the body, said assembly including a cross shaft having a crank therein, and a longitudinally extending main power cylinder pivotally supported from the frame and connected with the crank pin of said crank, the crank and main power cylinder being slightly short of but adjacent dead center when in starting position with the scoop in loading position; a booster arrangement comprising a booster power cylinder mounted in position adjacent the crank and having a piston rod projecting toward but separate from the crank, said main and booster cylinders being retracted and the piston rod of the booster cylinder being disposed to engage one cheek of the crank in turning relation thereto when the crank is in said starting position, and means to simultaneously supply fluid under pressure to the outer end of said power cylinders.

2. A booster arrangement as in claim 1 in which the booster power cylinder is of substantially shorter stroke than the main power cylinder whereby the piston rod of said booster power cylinder remains in contact with said cheek of the crank only through the starting portion of its arc of movement.

3. A booster arrangement as in claim 1 in which the booster power cylinder is of the same effective diameter as the main power cylinder but of substantially shorter stroke, whereby the piston rod of said booster cylinder remains in contact with said cheek of the crank only through the starting portion of its arc of movement, and thereafter the main power cylinder functions independently of said booster cylinder.

4. In a self-loading dump truck which includes a dump body mounted on the truck frame, and a swinging scoop assembly operative to load the scoop ahead of the truck and to swing the scoop upwardly and rearwardly to dumping position above the body, said assembly including a cross shaft having a crank therein, and a longitudinally extending main power cylinder pivotally supported from the frame and connected with the crank pin of said crank, the crank and main power cylinder being slightly short of but adjacent dead center when in starting position with the scoop in loading position; a booster arrangement comprising a booster power cylinder mounted in position adjacent the crank and having a piston rod projecting toward but separate from the crank, said main and booster cylinders being retracted when the crank is in starting position, the booster power cylinder being mounted so that it is then disposed with its axis at substantially right angles to one cheek of the crank and with its piston rod in position to engage said cheek of the crank adjacent the outer end of the latter, and means to simultaneously actuate both of said cylinders.

5. A booster arrangement as in claim 4 in which the crank includes a rounded cross member fixed on said one cheek of the crank in position for engagement by the outer end of the piston rod of the booster power cylinder.

6. A booster arrangement as in claim 1 in which both cylinders are of substantially the same effective diameter; the booster power cylinder being of substantially shorter stroke whereby the piston rod of said booster power cylinder remains in contact with said cheek of the crank only through the starting portion of its arc of movement.

7. In a self-loading dump truck which includes a dump body mounted on the truck frame, and a swinging scoop assembly operative to load the scoop ahead of the truck and to swing the scoop upwardly and rearwardly to dumping position above the body, said assembly including a cross shaft having a crank therein, and a longitudinally extending main power cylinder pivotally supported from the frame and connected with the crank pin of said crank, the crank and main power cylinder being slightly short of but adjacent dead center when in starting position with the scoop in loading position; a booster arrangement comprising a booster power cylinder mounted in position adjacent the crank and having a piston rod projecting toward but separate from the crank, said main and booster cylinders being retracted and the piston rod of the booster cylinder being disposed to engage one cheek of the crank in turning relation thereto when the crank is in said starting position, said main power cylinder being double-acting and having means associated therewith to supply fluid under pressure selectively to either end, and means establishing communication between the outer ends of the cylinders; the booster power cylinder being of the same effective diameter as the main power cylinder but of shorter stroke whereby the piston rod of said booster cylinder remains in contact with said cheek of the crank only through the starting portion of its arc of movement, and thereafter the main power cylinder functions independently of said booster cylinder.

8. In a self-loading dump truck which includes a dump body mounted on the truck frame, and a swinging scoop assembly operative to load the scoop ahead of the truck and to swing the scoop upwardly and rearwardly to dumping position above the body, said assembly including a cross shaft having a crank therein, and a longitudinally extending main power cylinder pivotally supported from the frame and connected with the crank pin of said crank, the crank and main power cylinder being slightly short of but adjacent dead center when in starting position with the scoop in loading position; a booster arrangement comprising a booster power cylinder mounted in position adjacent the crank and having a piston rod projecting toward the crank, said main and booster cylinders being retracted and the piston rod of the booster cylinder being disposed to engage the crank in turning relation thereto when the crank is in said starting position, and means to simultaneously supply fluid under pressure to the outer end of said power cylinder; said booster power cylinder being disposed above the crank, and the mounting means for said booster power cylinder comprising a rigid, inverted U-shaped yoke, the outer end of said cylinder being secured to the head of the yoke and said cylinder depending therefrom.

9. In a dump truck, a cab, a rearwardly tiltable dump body mounted to the rear of said cab, and a forwardly projecting hood fixed on the front end of said body and normally overhanging the cab in protective relation thereto; said hood including upstanding side plates which extend rearwardly to the dump body.

10. In a self-loading dump truck which includes a crank actuated loading scoop and a main power cylinder connected in actuating relation to the crank pin of said crank, said crank and cylinder being slightly short of dead center in one direction when in starting position; a booster arrangement comprising a booster power cylinder extending toward the crank from the opposite direction and having a piston rod separate from but disposed to engage one cheek of the crank in turning relation thereto when said crank is in said starting position, and mounting means for said booster power cylinder; there being means to simultaneously actuate the main and booster power cylinders, the latter having a limited stroke whereby said piston rod thereof remains in contact with the crank cheek through only the starting portion of the crank's arc of movement.

11. In a self-loading dump truck which includes a crank actuated loading scoop and a main power cylinder connected in actuating relation to the crank pin of said crank, said crank and cylinder being slightly short of dead center in one direction when in starting position; a booster arrangement comprising a booster power cylinder extending toward the crank from the opposite direction and having a piston rod separate from but disposed to engage one cheek of the crank in turning relation thereto when said crank is in said starting position, and mounting means for said booster power cylinder including a fixed, U-shaped yoke straddling the outer end thereof, said outer end of the booster power cylinder being secured to the head of the yoke; there being means to simultaneously actuate the main and booster power cylinder, the latter having a limited stroke whereby said piston rod thereof remains in contact with the crank cheek through only the starting portion of the crank's arc of movement.

ROY H. FROST.